US008115350B2

(12) United States Patent
Yoshida et al.

(10) Patent No.: US 8,115,350 B2
(45) Date of Patent: Feb. 14, 2012

(54) OSCILLATION TYPE ELECTROMAGNETIC POWER GENERATOR AND METHOD FOR MANUFACTURING OSCILLATION TYPE ELECTROMAGNETIC POWER GENERATOR

(75) Inventors: Tetsuo Yoshida, Tokyo (JP); Yukio Aizawa, Tokyo (JP); Shigemi Suganuma, Tokyo (JP); Kentaro Masuda, Tokyo (JP)

(73) Assignee: Sumida Corporation (JP)

( * ) Notice: Subject to any disclaimer, the term of this patent is extended or adjusted under 35 U.S.C. 154(b) by 151 days.

(21) Appl. No.: 12/599,036

(22) PCT Filed: Sep. 20, 2007

(86) PCT No.: PCT/JP2007/068307
 § 371 (c)(1),
 (2), (4) Date: Nov. 16, 2009

(87) PCT Pub. No.: WO2008/139646
 PCT Pub. Date: Nov. 20, 2008

(65) Prior Publication Data
 US 2010/0084928 A1    Apr. 8, 2010

(30) Foreign Application Priority Data
 May 9, 2007  (JP) ................. P2007-124927

(51) Int. Cl.
 *H02K 33/00* (2006.01)
(52) U.S. Cl. ........................... 310/15; 29/596
(58) Field of Classification Search ........ 310/15, 310/30, 36, 12.01–12.33; 29/596
 See application file for complete search history.

(56) References Cited

U.S. PATENT DOCUMENTS

| 5,434,549 | A   | * | 7/1995  | Hirabayashi et al. ......... 335/229 |
| 6,157,100 | A   | * | 12/2000 | Mielke .............................. 310/13 |
| 6,936,937 | B2  |   | 8/2005  | Tu et al. |
| 2005/0173991 | A1 | * | 8/2005 | Watarai et al. .................. 310/12 |

FOREIGN PATENT DOCUMENTS

| EP | 1665504 A1 | 6/2006 |
| GB | 2415095 A | 12/2005 |
| JP | 08-116658 | 5/1996 |
| JP | 2006-296144 A | 10/2006 |
| JP | 2006-523081 A | 10/2006 |
| JP | 2007-521785 A | 8/2007 |
| WO | WO 2004/093290 A2 | 10/2004 |
| WO | WO 2005/031952 A1 | 4/2005 |

* cited by examiner

*Primary Examiner* — Nguyen N Hanh
(74) *Attorney, Agent, or Firm* — David R. Stevens; Stevens Law Group

(57) ABSTRACT

A specific condition for enhancing the power generation efficiency of an oscillation type electromagnetic power generator is disclosed. Solenoid coils constituting the oscillation type electromagnetic power generator are wound in directions opposite to each other with a predetermined coil gap therebetween. Adjacent magnets of a movable magnet are connected to each other via a spacer having a predetermined thickness in such a manner that poles with the same polarity are opposed to each other. A coil pitch which is the total dimension of the coil length of one solenoid coil and the coil gap and a magnet pitch which is the total dimension of the magnet length of one magnet of the movable magnet and the thickness of the spacer are almost equal to each other, and the coil length is shorter than the magnet length.

6 Claims, 8 Drawing Sheets

FIRST SOLENOID COIL AND MAGNET

SECOND SOLENOID COIL AND MAGNET

THIRD SOLENOID COIL AND MAGNET

COMBINED OUTPUT VOLTAGE

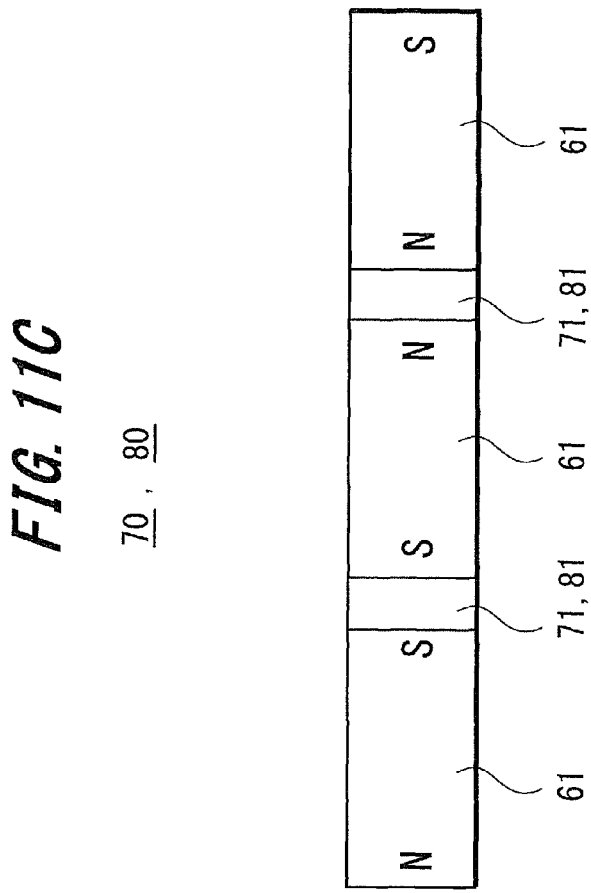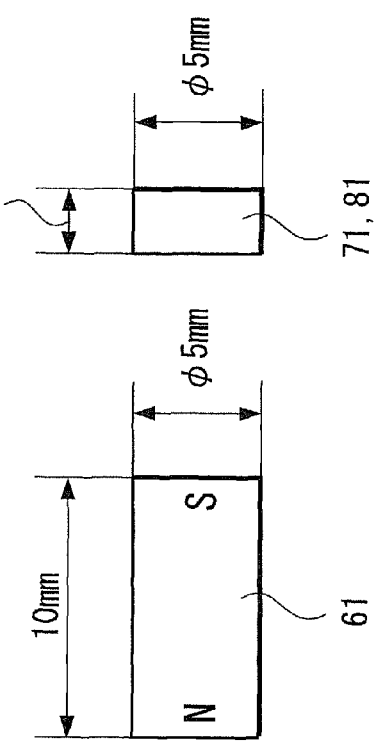

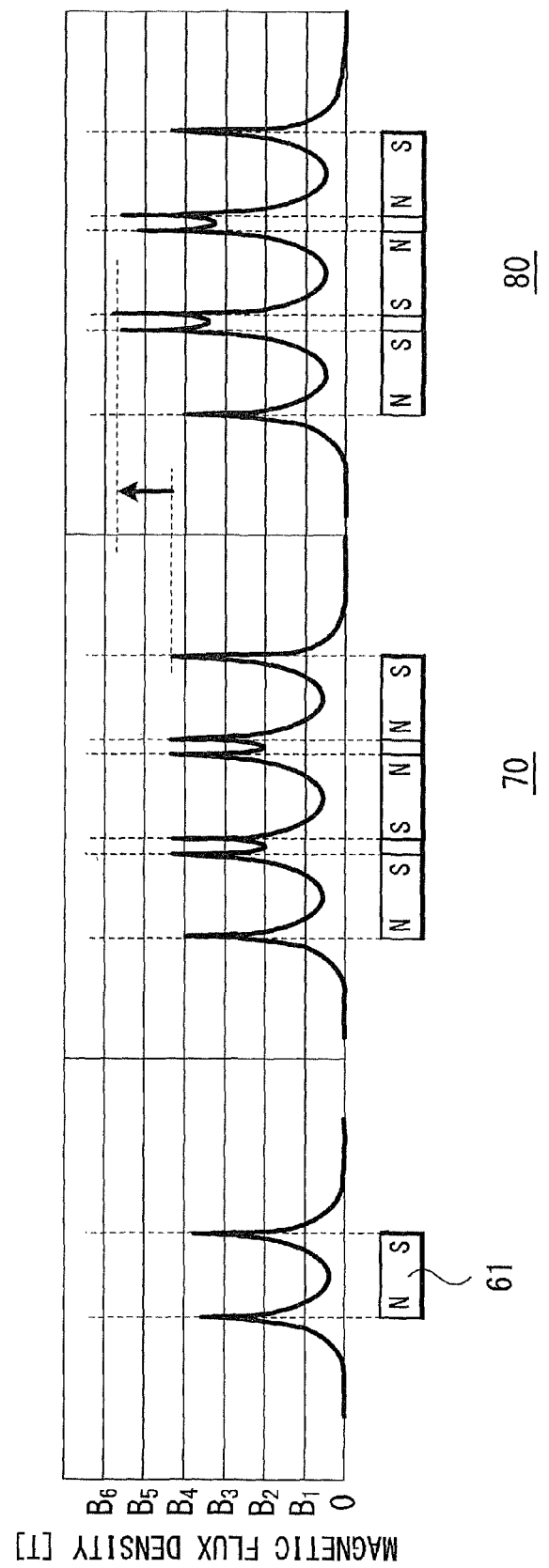

OSCILLATION TYPE ELECTROMAGNETIC POWER GENERATOR AND METHOD FOR MANUFACTURING OSCILLATION TYPE ELECTROMAGNETIC POWER GENERATOR

TECHNICAL FIELD

The present invention relates to an oscillation type electromagnetic power generator that generates a power generation voltage, for example, by oscillating or moving a plurality of cylindrical magnets magnetized in the longitudinal direction thereof through a plurality of solenoid coils and to a method for manufacturing the oscillation type electromagnetic power generator. In particular, the present invention relates to an oscillation type electromagnetic power generator in which the generation efficiency thereof is enhanced by unifying a plurality of magnets in such a manner that the poles with the same polarity are opposed to each other at specified intervals and to a method for manufacturing such an oscillation type electromagnetic power generator.

BACKGROUND ART

In recent years, portable electronic apparatuses, such as portable telephone terminals and game machines, have been popularized, and the number of rechargeable batteries built in these apparatuses has been increased more and more. In addition, concurrently with the development of wireless radio technology, the application of RFID (Radio Frequency IDentification) technology for sending signals with minute electric power has been expanded. Specifically, an active RFID with electric power is capable of communication to a distance of several hundred meters or more. Therefore, there are increasing expectations for its use in healthcare for cattle, horses, and so on in a pasture, safety management for children on their way to and from school, and so on.

On the other hand, to maintain and improve the global environment, researches and developments of a battery with less environmental impact as possible also have been actively conducted. Among them, it is widely considered that the energy generally consumed uselessly and unconsciously may be converted into electric energy to recharge batteries and that this energy may be used as electric power supplies of portable apparatuses or the like.

Patent Document 1 discloses an oscillation type power generator that employs a system in which a plurality of permanent magnets magnetized in the longitudinal direction thereof is arranged in such a manner that the poles with the same polarity are opposed to each other at a minute distance and unified together to provide a movable magnet; and the movable magnet is allowed to move through a plurality of coils serially connected in such a manner that adjacent coils have opposite polarities.

Patent Document 2 discloses a power generator in which a plurality of magnets is joined such that the surfaces of the poles with the same polarity are opposed to each other and coils are connected in series in such a manner that adjacent coils have opposite polarities.

Patent Document 1: Japanese Unexamined Patent Application Publication No. 2006-296144
Patent Document 2: Japanese Unexamined Patent Application Publication (Japanese Translation of PCT International Application) No. 2006-523081

DISCLOSURE OF THE INVENTION

Meanwhile, the inventors of the present application have studied the conditions for further enhancing power generation efficiency. As a result, the inventors have found that the most important requirement for constructing an oscillation type electromagnetic power generator using a plurality of magnets and a plurality of coils is to match a magnet pitch given as a total dimension of the length of a magnet (magnet length) and a minute distance (spacer thickness) with a coil pitch given as a total dimension of a coil length and a coil gap.

If the requirement is not met, voltages generated with the plurality of coils are out of phase with one another and the respective voltages then cancel one another, thereby causing a problem of lowering a combined output voltage. However, in Patent Document 1, there is no description about the necessity of matching a magnet pitch with a coil pitch and also no disclosure of how to define a reference magnet length.

In addition, the plurality of magnets, structural components of the power generator disclosed in Patent Document 2, are directly joined in such a manner that the poles with the same polarity are opposed to each other without using any spacer. Two or more coils are also aligned without any coil gap. Furthermore, there is no disclosure of how to concretely determine the dimensions of a magnet and the dimensions of a coil to enhance power generation efficiency.

Furthermore, as described in Patent Document 2, a direct connection between the poles with the same polarity of magnets leads to a decrease in power generation efficiency because of demagnetization. Furthermore, since the repulsion of the poles with the same polarity is extremely large, there is a problem that a connecting operation may become difficult.

The present invention intends to provide an oscillation type electromagnetic power generator that is smaller than the conventional one while having high power generation efficiency, by clarifying a specific condition for enhancing the power generation efficiency, which has been unclear in the conventional oscillation type electromagnetic power generator.

An oscillation type electromagnetic power generator of the present invention includes a power generation coil in which two or more solenoid coils are connected in series; and a movable magnet including a plurality of magnets which are arranged such that magnetic poles of magnets facing each other have the same polarity, the movable magnet located inside of the power generation coil and movable in a direction along a winding axis of the power generation coil. The two or more solenoid coils of the power generation coil are spaced apart one from another with a predetermined coil gap and wound in directions reverse to each other for every adjacent coils. The adjacent magnets of the movable magnet are connected to each other via a spacer having a predetermined thickness in such a manner that the poles with the same polarity are opposed to each other. A coil pitch which is a total dimension of a coil length of one solenoid coil of the two or more solenoid coils and the coil gap is substantially equal to a magnet pitch which is a total dimension of a magnet length of one magnet of the movable magnet and the thickness of the spacer, and the coil length is shorter than the magnet length.

Furthermore, the present invention is a method for manufacturing an oscillation type electromagnetic power generator that includes a power generation coil in which two or more solenoid coils are connected in series, and a movable magnet including a plurality of magnets which are arranged such that magnetic poles of magnets facing each other have the same polarity, the movable magnet located inside of the power generation coil and movable in a direction along a winding axis of the power generation coil, wherein the two or more solenoid coils of the power generation coil are spaced apart one from another with a predetermined coil gap and wound in directions reverse to each other for every adjacent coils, the adjacent magnets of the movable magnet are connected to each other via a spacer having a predetermined thickness in such a manner that the poles with the same polarity are opposed to each other, a coil pitch which is a total dimension of a coil length of one solenoid coil of the two or more solenoid coils and the coil gap is substantially equal to a magnet pitch which is a total dimension of a magnet length of one magnet of the movable magnet and the thickness of the spacer, and the coil length is shorter than the magnet length. The method for manufacturing the oscillation type electromagnetic power generator includes the steps of making a solenoid coil having a predetermined coil diameter, a predetermined number of turns per unit length, and a coil length which is at least three times longer than the coil diameter; measuring rise characteristics of an output voltage when allowing a magnet having a predetermined magnet diameter and a length that is substantially the same as the coil length to pass through the solenoid coil at a predetermined passage speed; obtaining from the measured rise characteristics a rise time elapsing from when the output voltage reaches 10% of a peak amplitude to when the output voltage reaches 90% of the peak amplitude; and determining a length which is substantially two times as long as a length obtained from the rise time and the passage speed as a length of the magnetic pitch.

According to the present invention, since the spacer for magnet, the magnet, the coil, and the coil gap can be optimally designed, an oscillation type electromagnetic power generator with enhanced power generation efficiency can be obtained.

According to the present invention, the optimal design of an oscillation type electromagnetic power generator when the number of magnets and the number of coils are increased is enabled, so that it is effective in obtaining the peak generated power. In addition, since the spacer for magnet, the magnet, the coil, and the coil gap can be optimally designed, it is effective in decreasing the dimensions of the power generator.

BRIEF DESCRIPTION OF THE DRAWINGS

FIG. 11A, FIG. 11B, and FIG. 11C are external configuration diagrams illustrating examples of a cylindrical magnet, a spacer for magnet and a movable magnet according to an embodiment of the present invention, respectively.

FIG. 12A, FIG. 12B, and FIG. 12C are explanatory diagrams illustrating examples of magnetic flux densities caused by a cylindrical magnet and a movable magnet according to an embodiment of the present invention, respectively.

BEST MODE FOR CARRYING OUT THE INVENTION

Hereinafter, an embodiment of the present invention will be described with reference to FIG. 1 to FIG. 12. In the present embodiment, an example in which the present invention is applied to an oscillation type electromagnetic power generator that generates electric power as a result of moving a magnet arranged in a solenoid coil by oscillation from the outside.

First, before describing a concrete example of the structure of an oscillation type electromagnetic power generator according to the present invention, a power generator including a movable magnet and a solenoid coil will be described with reference to FIG. 1 to FIG. 3.

Figure 1:
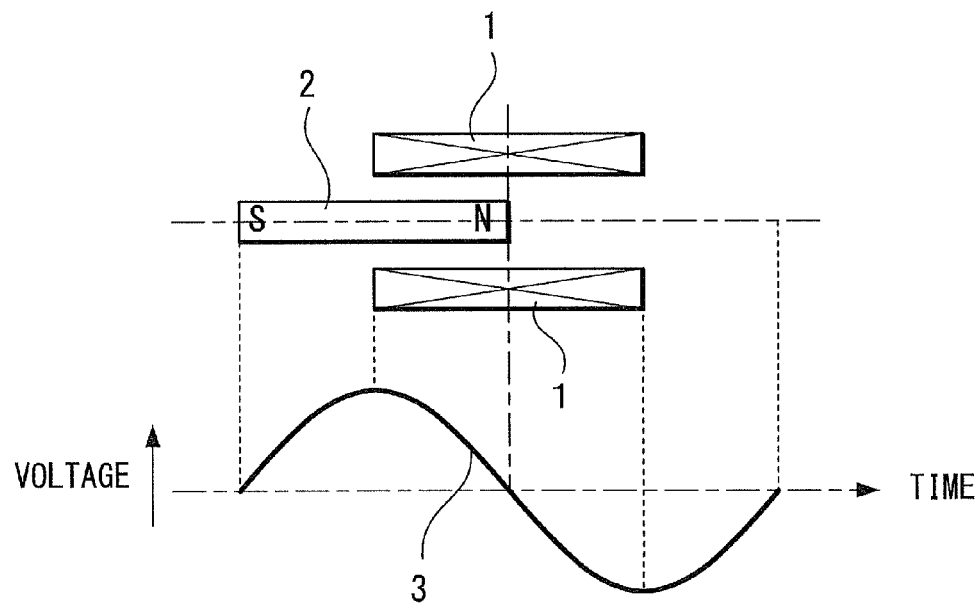
FIG. 1 is an explanatory diagram illustrating an example of an output voltage waveform produced when one cylindrical magnet of an oscillation type electromagnetic power generator passes through a solenoid coil.

FIG. 1 illustrates an example of the structure of an oscillation type electromagnetic power generator 10 including one cylindrical magnet 2 and one solenoid coil 1, and also illustrates an example of an output voltage waveform.

The length of the solenoid coil 1 of the oscillation type electromagnetic power generator 10 is substantially equal to the length of the cylindrical magnet 2. In addition, an output voltage, which is obtained when the cylindrical magnet 2 passes through the solenoid coil 1 in the direction of the winding axis thereof, is represented as an output voltage waveform 3.

The wavelength of the output voltage waveform 3 is substantially twice as long as the magnet length or the coil length (the length of the solenoid coil), and the waveform period thereof is substantially identical to a cycle of a sine wave. In other words, in FIG. 1, when the horizontal axis of the output voltage waveform is employed as a time axis, the time of one cycle corresponds to a value obtained by dividing a distance twice as long as the magnet length by a passage speed.

By the way, the oscillation type electromagnetic power generator according to the present invention includes solenoid coils and a movable magnet that travels through the solenoid coils. The movable magnet includes two or more magnets connected such that the poles with the same polarity are opposed to each other. In addition, the solenoid coils are connected in series such that adjacent coils have opposite polarities. Then, the output voltage of the oscillation type electromagnetic power generator according to the present invention is obtained by summing output voltages that are generated from respective solenoid coils by the movable magnet traveling through the solenoid coils. At this time, the waveform of the output voltage generated for each solenoid coil is like the voltage waveform shown in FIG. 1. In addition, it is important to match the phases of voltages generated from all the coils and to make the output voltage highest by summing the voltages from respective coils. For that purpose, it is necessary that a magnet pitch, the sum of the magnet length and the thickness of the spacer for magnet, is substantially equal to a coil pitch, the sum of the coil length and the coil gap.

In addition, if the magnets are made of the same material, to obtain a small power generator with higher power generation efficiency, it becomes an important challenge how a larger output voltage can be obtained by a short magnet length. For this reason, the inventors of the present invention have verified the characteristics of the oscillation type electromagnetic power generator according to the present invention under various conditions.

Figure 2:
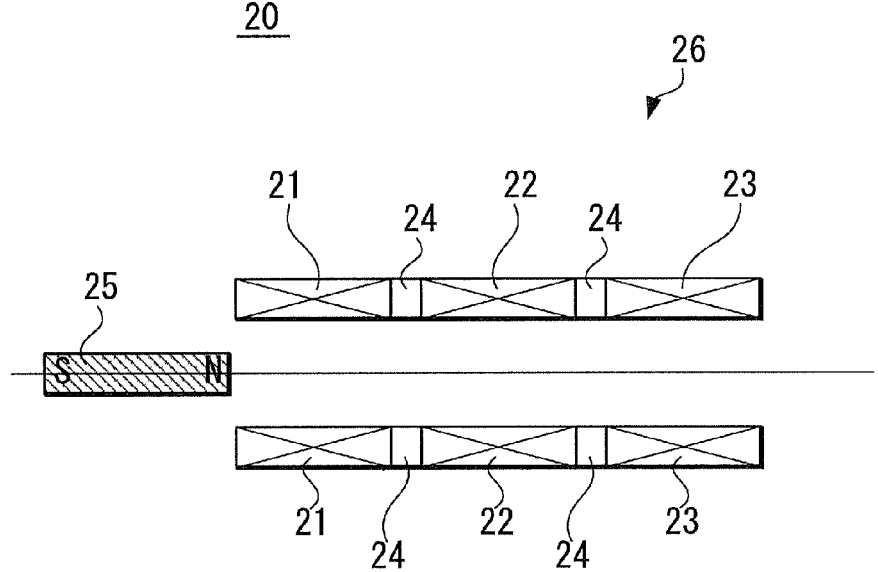
FIG. 2 is a cross-sectional diagram illustrating an example of the structure of an oscillation type electromagnetic power generator.

FIG. 2 is a cross-sectional diagram of an oscillation type electromagnetic power generator 20 including a movable magnet 25 constituted of one magnet and three solenoid coils (i.e., a first solenoid coil 21, a second solenoid coil 22, and a third solenoid coil 23).

The adjacent solenoid coils are spaced apart from each other with a predetermined gap 24. The coil-winding directions of these solenoid coils are reverse to each other for every adjacent coils, that is, these coils are wound in the normal, reversal, and normal directions, respectively. The first solenoid coil 21, the second solenoid coil 22, and the third solenoid coil 23 connected in series are collectively referred to as a power generation coil 26. The length of the movable magnet 25 is equal to the sum of the coil length and the coil gap (e.g., the total length of the solenoid coil 21 and the gap 24).

Figure 3:
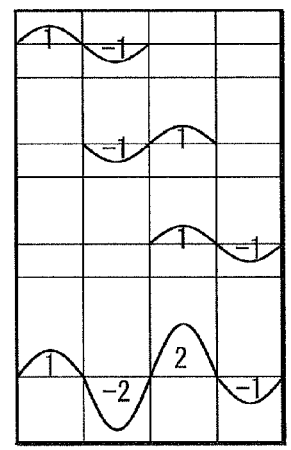
FIG. 3 is a schematic diagram illustrating examples of output voltage waveforms when a movable magnet passes through first to third solenoid coils.

FIG. 3 is a schematic diagram of an output voltage waveform when the movable magnet 25 is passed through each of the first solenoid coil 21, the second solenoid coil 22, and the third solenoid coil 23 connected in series in such a manner that the polarities thereof are normal, reversal, and normal, respectively. The scale of the horizontal axis in FIG. 3 is a time scale corresponding to the magnet length (=coil length+gap).

In FIG. 3, each number in the graph represents the amplitude ratio between the output voltage of each of solenoid coils and the combined output voltage.

The polarities of the first solenoid coil 21, the second solenoid coil 22, and the third solenoid coil 23 are normal, reversal, and normal, respectively. Therefore, the voltages generated in the first solenoid coil 21, the second solenoid coil 22, and the third solenoid coil 23 are phase-shifted by the time corresponding to the magnet length, and the polarities thereof are also changed.

In addition, the first solenoid coil 21, the second solenoid coil 22, and the third solenoid coil 23 are serially connected to one another. Therefore, the output voltage is a combined output voltage obtained by summing up voltages generated from the first to third solenoid coils 21 to 23. At this time, a combined output voltage waveform shown in FIG. 3 is obtained.

Next, an example of the structure of an oscillation type electromagnetic power generator 40 according to the present invention will be described with reference to the cross-sectional diagram of FIG. 4.

The oscillation type electromagnetic power generator 40 includes a movable magnet 48 constructed of a plurality of magnets, and three solenoid coils (a first solenoid coil 41, a second solenoid coil 42, and a third solenoid coil 43).

The adjacent solenoid coils are spaced apart from each other with a predetermined gap 44. The coil-winding directions of these coils are reverse to each other for every adjacent coils, that is, these coils are wound in the normal, reversal, and normal directions, respectively. The first solenoid coil 41, the second solenoid coil 42, and the third solenoid coil 43 connected in series are collectively referred to as a power generation coil 49.

The movable magnet 48 includes two magnets 45 and 46 having the same length and magnetized in the longitudinal directions thereof and integrally connected to each other through a spacer 47 made of a nonmagnetic material with a predetermined thickness in such a manner that the poles with the same polarity are opposed to each other.

A magnet pitch 51, a total dimension of the magnet length and the spacer 47, is equal to a coil pitch 52, a total dimension of the solenoid coil and the solenoid coil gap. Even under such conditions, however, it is preferable that the coil length is shorter than the magnet length.

Figure 4:
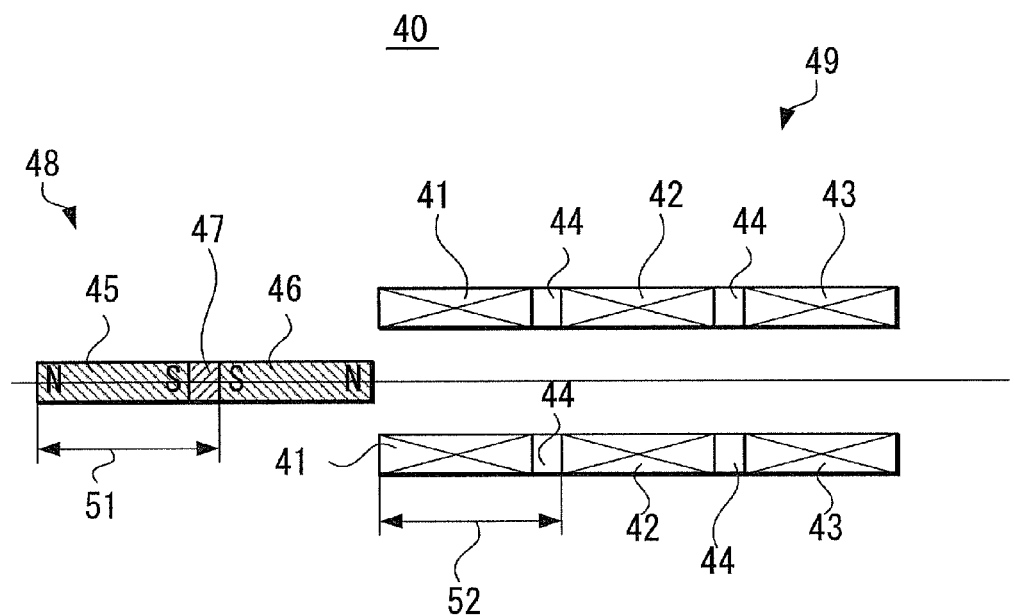
FIG. 4 is a cross-sectional diagram illustrating an example of the structure of an oscillation type electromagnetic power generator.
Figure 5:
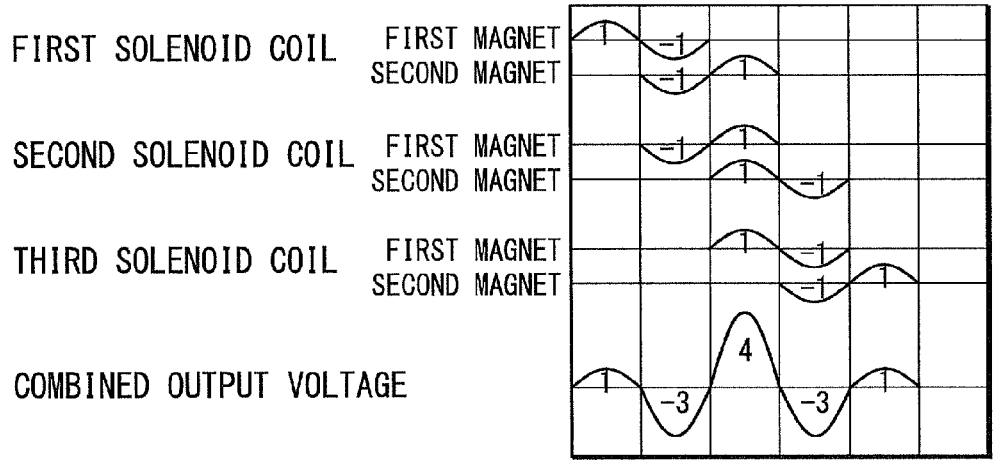
FIG. 5 is an explanatory diagram illustrating examples of output voltage waveforms when first and second magnets pass through first to third solenoid coils, respectively.

FIG. 5 is a schematic diagram of output voltage waveforms when two magnets 45 and 46 are passed through the first solenoid coil 41, the second solenoid coil 42, and the third solenoid coil 43 which are connected one after another such that the polarities thereof are normal, reversal, and normal, respectively, as shown in FIG. 4. In FIG. 5, each number in the graph represents the amplitude ratio between the output voltage of each of solenoid coils and the combined output voltage thereof.

When two magnets 45 and 46 having different polarities pass through each of the solenoid coils, voltages phase-shifted by the time corresponding to the magnet length are generated for the respective solenoid coils. An output voltage provided as a sum of these voltages has a combined output voltage waveform shown in FIG. 3.

As shown in FIG. 2 and FIG. 4, in the oscillation type electromagnetic power generators 20 and 40, the magnet and the solenoid coil are arranged in proximity to each other. Therefore, as shown in FIG. 3 and FIG. 5, there is a basic property that output voltages are combined and a part of the amplitude of a combined output voltage is amplified several-fold. Using such a basic property, the inventors of the present invention aim to increase the output power from an oscillation type electromagnetic power generator. And, in the oscillation type electromagnetic power generator of the present invention, it is very important that the magnet pitch 51 is equal to the coil pitch 52.

Figure 6:
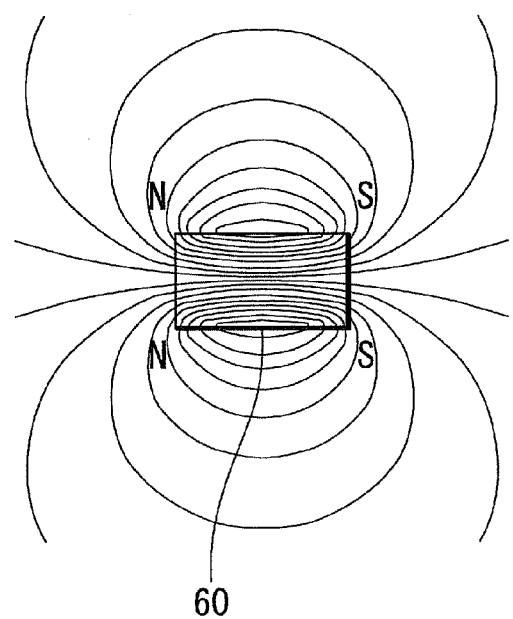
FIG. 6 is a cross-sectional diagram illustrating an example of distribution of a magnetic field formed in space by a cylindrical magnet.

Here, the distribution of a magnetic field formed in space by the cylindrical magnet 60 will be described with reference to FIG. 6. FIG. 6 is a cross-sectional diagram illustrating an exemplary distribution of a magnetic field formed in space by the cylindrical magnet 60.

As is evident from FIG. 6, the magnetic fields around the end surfaces of the magnet can reach places away from the area corresponding to the length of the cylindrical magnet 60. In addition, it is shown that the directions of the magnetic fields around the end surfaces of the cylindrical magnet 60 are not in parallel with the longitudinal direction of the cylindrical magnet 60. Therefore, there is a need of efficiently coupling the solenoid coil with the magnetic fields that are in parallel with the longitudinal direction of the magnet by designing the coil length shorter than the magnet length.

So far, it has been described that in order to enhance the power generation efficiency, it is necessary to equalize the magnetic pitch to the coil pitch and to design the coil length shorter than the magnet length. Hereinafter, a method for determining a magnet length and a magnet pitch most suitable for enhancing the power generation efficiency will be described.

Figure 7:
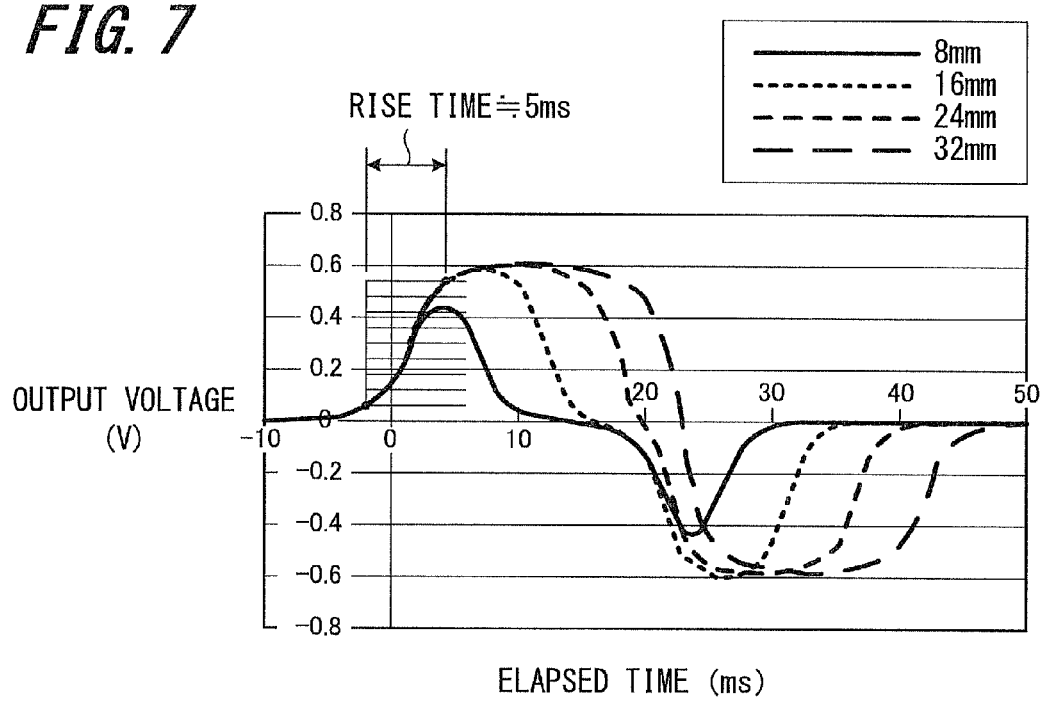
FIG. 7 is an explanatory diagram illustrating examples of actual measurement values of output voltage waveforms when four cylindrical magnets of different magnet lengths pass through a solenoid coil with a predetermined coil length, respectively.

FIG. 7 illustrates examples of actual measurement values of output voltages obtained by passing four different cylindrical magnets of different magnet lengths through a solenoid with a predetermined coil length at a speed of 1.2 m/s.

These four different cylindrical magnets have the same diameter of 4 mm but different magnet pitches of 8 mm, 16 mm, 24 mm, and 32 mm, respectively.

The solenoid coil has an inner diameter of 6 mm, a number of turns per unit length of 60, and a coil length of 30 mm.

As is evident from FIG. 7, the rise characteristics of output voltages when the magnet length is increased are substantially the same in all cases of magnet length. In addition, the peak value of the output voltage increases when the magnet length increases from 8 mm to 16 mm, but it is substantially constant even when the magnet length increases from 16 mm to 32 mm. However, as the magnet length increases, the duration time of the peak value of the output voltage increases.

Furthermore, as shown in FIG. 7, the rise characteristics of the output voltages are substantially unchanged with the respective magnet lengths. Therefore, it is believed that factors defining the rise characteristics include the diameter of the magnet and the dimensions of the solenoid coil, especially the inner diameter of the solenoid coil. For this reason, the rise time can be shortened more by bringing the inner diameter of the solenoid coil close to the diameter of the magnet.

Here, paying an attention to the cylindrical magnets with lengths of 16 mm, 24 mm, and 32 mm generating the peak output voltages, a time elapsing from when the output voltage reaches from 10% of the peak value to when the output voltage reaches 90% of the peak value is obtained from the rise characteristics of the output voltages shown in FIG. 7. In this case, as shown in the figure, the time is approximately 5 ms. At this time, the moving speed of the magnet is 1.2 m/s, so that a moving distance corresponding to twice the rise time of 5 ms is 1.2 (m/s)×5 (ms)×2=12 mm.

In other words, it may be said that the magnet length of 12 mm allows the output voltage to be substantially equal to the peak value while allowing provision of the shortest magnet length.

Figure 8:
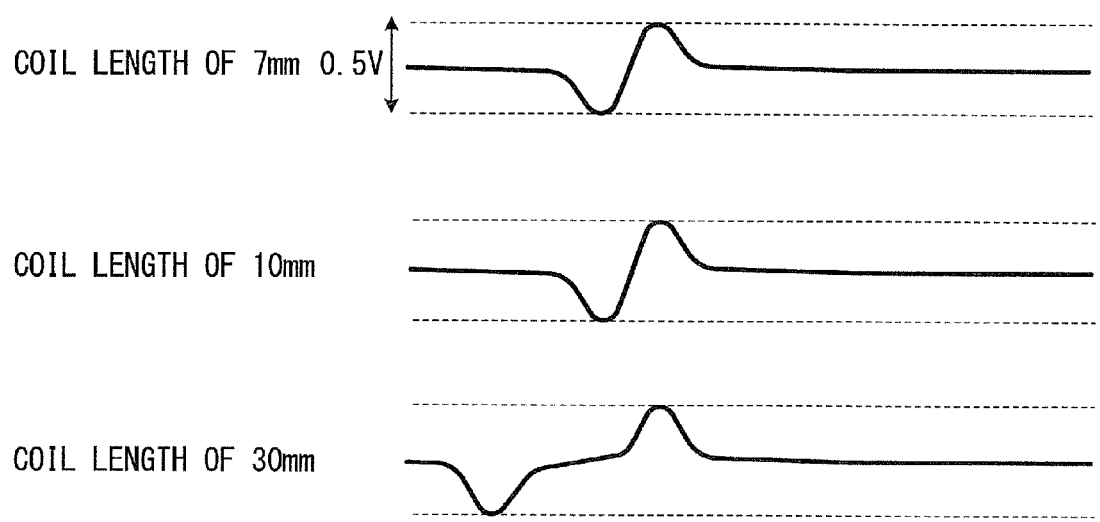
FIG. 8 is an explanatory diagram illustrating examples of actual measurement values of output voltage waveforms when a cylindrical magnet with a predetermined magnet length passes through each of three solenoid coils of different coil lengths.

FIG. 8 illustrates examples of the actual measurement values of the output voltage when a cylindrical magnet of a predetermined magnet length passes through three different solenoid coils of different coil lengths.

The cylindrical magnet has a diameter of 4 mm and a magnet length of 8 mm.

The solenoid coils have the same number of turns per unit length but different coil lengths of 7 mm, 10 mm, and 30 mm, respectively.

As is evident from FIG. 8, in the case of the magnet of 8 mm in length, even if the coil length is increased from 7 mm to 10 mm, the output voltage would only increase slightly. Also, even if the coil length is increased from 7 mm to 30 mm, the peak amplitude of output voltage is substantially constant (approximately 0.5 V).

That is, for one magnet of 8 mm in length, as shown in FIG. 1, if the coil length is set to be equal to the magnet length of 8 mm, the output voltage almost reaches the peak value (saturation voltage).

The oscillation type power generator in which the movable magnet has one magnet has been described as an example, with reference to FIG. 7 and FIG. 8. In contrast, in the case of the oscillation type power generator 40 constructed of a movable magnet including a plurality of magnets (at least two or more) and a plurality of solenoid coils, the shortest magnet pitch that leads to the peak output voltage for a predetermined coil dimension can be selected under similar conditions.

In other words, the entire dimensions of the oscillation type power generator 40 can be reduced while obtaining high power generation efficiency by equalizing the magnet pitch, a total dimension of the magnet length and the spacer thickness, to the coil pitch, a total dimension of the coil length and the coil gap. Here, it is preferable that while the magnet pitch is equal to the coil pitch, the coil length is shorter than the magnet length.

Thus, in the case of the oscillation type electromagnetic power generator 40 including a plurality of magnets and a plurality of solenoid coils, the shortest magnet pitch that leads to the peak output voltage with respect to a predetermined solenoid coil size can be selected. Therefore, the oscillation type electromagnetic power generator 40 with high power generation efficiency can be obtained even if the dimensions thereof are small.

Here, the procedure for obtaining an optimal magnet pitch for enhancing power generation efficiency will be described below.

(1) First, a solenoid coil having a predetermined coil diameter, a predetermined number of turns per unit length, and a coil length at least three or more times longer than the coil diameter is prepared.

(2) Next, a magnet having a predetermined magnet diameter and substantially the same length as the coil length is allowed to pass through the solenoid coil at a constant speed, and rise characteristics of an output voltage at this time are measured.

(3) Based on the resulting rise characteristics, a time elapsing from when the output voltage reaches 10% of the peak amplitude to when the output voltage reaches 90% of the peak amplitude is determined.

(4) Then, a length almost twice as long as the distance obtained from the resulting time and the passage speed is defined as a desired magnetic pitch.

After obtaining the magnet pitch, dimensional conditions of a coil gap and a spacer for magnet are determined under the conditions that the total dimension of the coil length of the solenoid coil and the coil gap is set to be equal to the magnet pitch; and the magnet length is longer than the coil length of the aforementioned solenoid coil. Thus, an oscillation type electromagnetic power generator which can obtain a voltage near the peak output and which can be minimized in the dimensions of the main body of the power generator can be obtained.

In the above description, the predetermined coil diameter, the predetermined number of turns per unit length, and the predetermined magnet diameter mean dimensions used for an oscillation type electromagnetic power generator to be prepared, respectively.

Here, an exemplary external configuration of the oscillation type electromagnetic power generator 40 will be described with reference to the perspective diagram of FIG. 9.

Figures 9A, 9B:
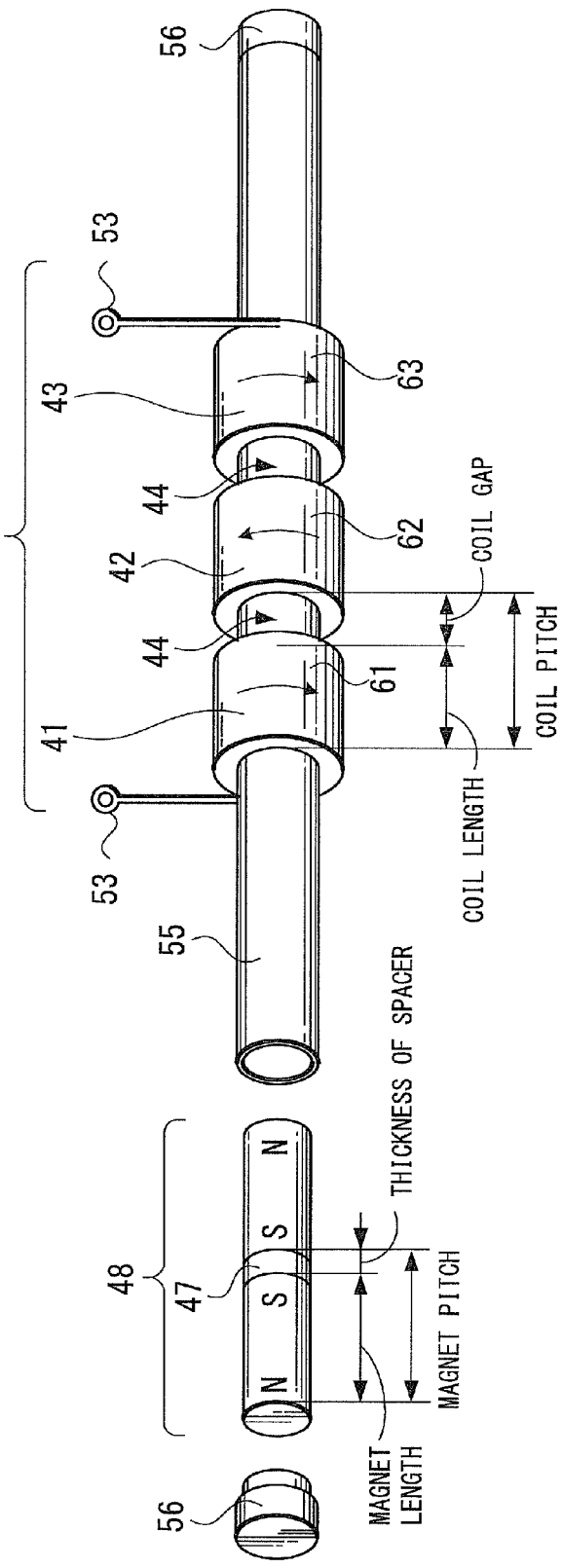
FIG. 9A and FIG. 9B are external perspective diagrams illustrating an example of the structure of an oscillation type electromagnetic power generator according to an embodiment of the present invention.

FIG. 9A is a perspective view of the oscillation type electromagnetic power generator 40, where the respective components thereof have been disassembled.

FIG. 9B is a partially transparent view of the oscillation type electromagnetic power generator 40 in which respective components have been assembled, where a housing case 55 among the components thereof is illustrated partially transparent.

The first solenoid coil 41, the second solenoid coil 42, and the third solenoid coil 43 are wound around the outer peripheral surface of the cylindrical housing case 55 that houses the movable magnet 48, at intervals of solenoid coil gaps 44. The first to third solenoid coils 41 to 43 are connected to one another in series. In addition, these solenoid coils are wound in directions reverse to one another, or in normal, reversal, and normal winding directions, respectively.

Coil terminals 53 are drawn out from the first solenoid coil 41 and the third solenoid coil 43 and connected to external components (loads) which are not shown in the figure, respectively.

To house the movable magnet 48 in the housing case 55, end caps 56 are attached to both ends of the housing case 55, respectively. The end caps 56 are made of resin or the like that relaxes an impact against the movable magnet.

The movable magnet 48 moves smoothly through the housing case 55, with the result that it moves through the first to third solenoid coils 41 to 43 in the winding axis directions thereof. Therefore, the first to third solenoid coils 41 to 43 generate voltages and function as a power generator.

Here, an example of an actual measurement value of an output voltage waveform actually obtained using the oscillation type electromagnetic power generator 40 will be described with reference to FIG. 10.

A movable magnet is constructed of two Nd (neodymium) magnets of 4 mm in diameter and 8 mm in length connected to each other in such a manner that the poles with the same polarity are opposed to each other via a spacer of 1.5 mm in thickness.

The three solenoid coils, each coil having a coil length of 6.5 mm, a coil inner diameter of 5 mm, a number of turns of 3,000, are connected in series at intervals of 3-mm coil gaps, while being wound in normal, reversal, and normal directions, respectively.

Figure 10:
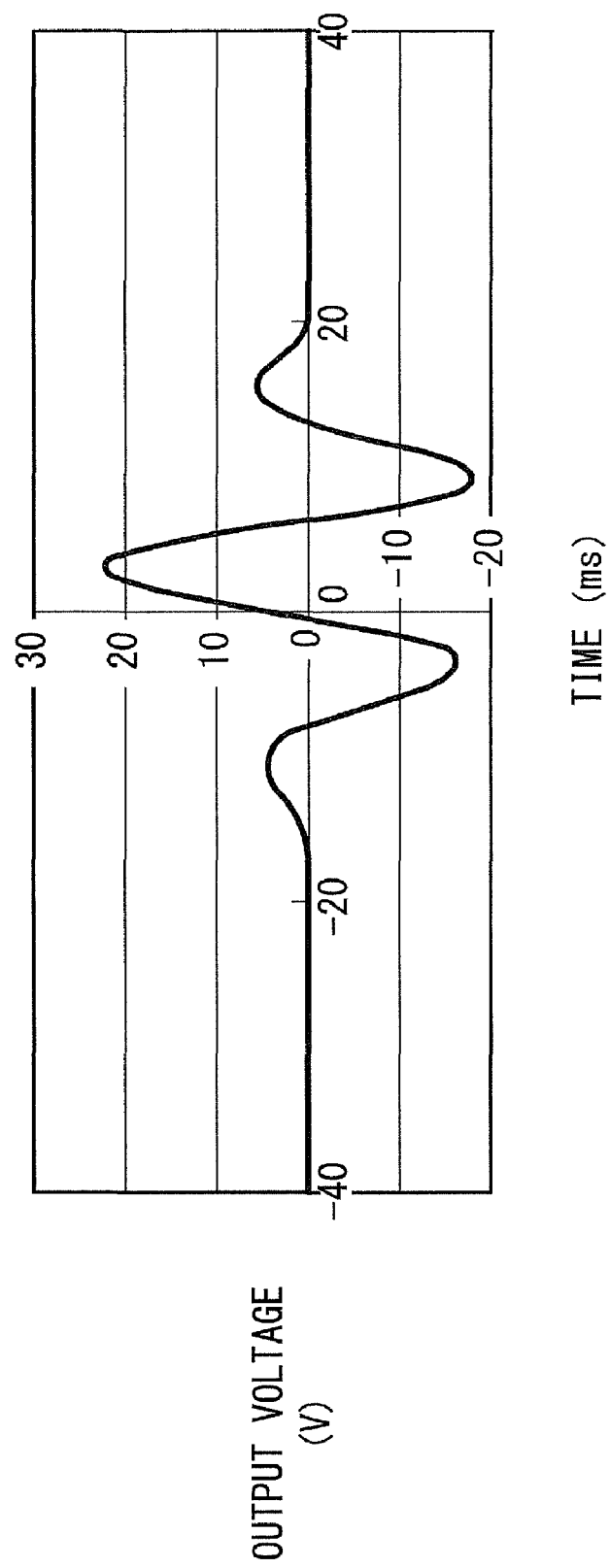
FIG. 10 is an explanatory diagram showing an example of measurement of an output voltage waveform of an oscillation type electromagnetic power generator according to an embodiment of the present invention.

Furthermore, FIG. 10 illustrates an output voltage waveform obtained when the movable magnet is moved at a speed of approximately 1.2 m/s through the solenoid coils along the winding axis direction thereof.

Comparing FIG. 10 with the waveform of the combined output voltage shown in FIG. 5, they coincide with each other very well. It may be said that this indicates the validity of contents explained with reference to FIG. 1 to FIG. 5.

Here, referring now to FIG. 11 and FIG. 12, examples of magnetic flux densities for respective movable magnets, where the materials of spacers are different from each other, will be described.

FIG. 11 illustrates exemplary configurations of a cylindrical magnet and a movable magnet in which cylindrical magnets are connected via spacers.

FIG. 11A illustrates an example of the structure of a cylindrical magnet 61. The cylindrical magnet 61 has an axial length of approximately 10 mm and a diameter of approximately 5 mm.

FIG. 11B illustrates an example of the structure of each of spacers 71 and 81. For the material for forming the spacer 71, as a nonmagnetic material, for example resin may be used. For the material for forming the spacer 81, as a magnetic material, for example pure iron may be used. Each of the spacers 71 and 81 has an axial length of approximately 2 mm and a diameter of approximately 5 mm.

FIG. 11C illustrates an example of the structure of each of movable magnets 70 and 80. The movable magnet 70 is constructed of three cylindrical magnets 61 connected in such a manner that the poles with the same polarity are opposed to each other via the spacer 71 made of a nonmagnetic material. On the other hand, the movable magnet 80 is constructed of three cylindrical magnets 61 connected in such a manner that the poles with the same polarity are opposed to one another via the spacer 81 made of a magnetic material.

FIG. 12 illustrates examples of the measurement results of magnetic flux densities near the surfaces of the cylindrical magnet 61 and the movable magnets 70 and 80 along the length direction of the magnets, caused by the cylindrical magnet 61 and the movable magnets 70 and 80.

FIG. 12A illustrates a result of measuring the magnetic flux density of one cylindrical magnet 61.

FIG. 12B illustrates a result of measuring the magnetic flux density of the movable magnet 70.

FIG. 12C illustrates a result of measuring the magnetic flux density of the movable magnet 80.

In FIGS. 12A to 12C, the vertical axis representing the magnetic flux density is provided with equally spaced marks ($B_1$ to $B_6$) to compare the respective figures with one another.

As shown in FIG. 12A, in general, at the end portions (in the vicinities of the N pole and the S pole) of the cylindrical magnet 61, because magnetic fluxes are concentrated, the magnetic flux densities are increased.

In addition, as shown in FIG. 12B and FIG. 12C, the magnets connected in such a manner that the poles with the same polarity are opposed to each other show higher peaks of magnetic flux densities in the vicinities of their N poles and S poles, compared with the magnetic flux density of one cylindrical magnet 61. This is because as a result of the connection of the magnets in such a manner that the poles with the same polarity are opposed to each other, mutual repulsion of magnetic fluxes is caused, and thereby an increase in magnetic flux density occurs.

Furthermore, by making a comparison between FIG. 12B and FIG. 12C, it is perceived that the movable magnet 80 including the spacer 81 made of a magnetic material shows the peak magnetic flux density higher than that of the movable magnet 70 including the spacer 71 made of a nonmagnetic material. At this time, the peak magnetic flux density of the movable magnet 80 is approximately 3/2 times as high as the peak magnetic flux density of the movable magnet 70. It is believed that this is because the spacer 81 made of a magnetic material with high magnetic permeability tends to draw magnetic field lines from the cylindrical magnet 61 and thereby the directivity of magnetic flux increases and the magnetic flux density also increases.

As is evident from the measurement results shown in FIGS. 12A to 12C, when the oscillation type power generator is constructed using the movable magnet 80 including the spacer made of a magnetic material, the magnetic flux density increases and the number of magnetic fluxes intersecting the solenoid coil flux increases. Therefore, in the case that the material used for a spacer for magnet is a magnetic material, the power generation efficiency of an oscillation type electromagnetic power generator may be further enhanced as compared with a case that the material used for the spacer is a nonmagnetic material.

As described above, concrete conditions for enhancing the power generation efficiency of the oscillation type electromagnetic power generator 40 have been clarified, so that it is now possible to suitably design a magnet pitch and a coil pitch of the oscillation type electromagnetic power generator 40. Therefore, there is an effect that the oscillation type electromagnetic power generator 40 which is small but yet has high power generation efficiency can be obtained.

Furthermore, the oscillation type electromagnetic power generator 40 is constructed simply. Therefore, there is an effect that the process of assembling becomes easy and the break-proof, reliable oscillation type electromagnetic power generator 40 is obtained.

Also, since magnetic flux density can be enhanced when the spacer for magnet is made of a magnetic material, there is an advantageous effect of enhancing the generating capacity of the oscillation type electromagnetic power generator. Therefore, when drawing attention to the production of electricity to be obtained, the same production of electricity can be obtained even if the external dimensions of such an oscillation type electromagnetic power generator are smaller than those of the oscillation type electromagnetic power generator using a spacer made of a nonmagnetic material. In this case, the number of turns of the solenoid coil may be reduced. Therefore, it is effective in further reducing the size of the oscillation type electromagnetic power generator while reducing the weight thereof. Furthermore, an effect of cost reduction can be attained by reducing the number of components used.

On the other hand, there is an advantageous effect of cheaply manufacturing the oscillation type electromagnetic power generator by making the spacer for magnet with a nonmagnetic material, compared with a case of making the spacer with a magnetic material. Furthermore, since synthetic resin such as plastics is used as the nonmagnetic material, there is an advantageous effect of enhancing the rate of production due to the excellent processability of the synthetic resin.

Although the oscillation type electromagnetic power generator 40 is constructed of a combination of two or more magnets and two or more solenoid coils, an oscillation type electromagnetic power generator may be constructed of a combination of three or more magnets and four or more solenoid coils.

In the above-described embodiment, the adjacent solenoid coils are spaced apart from each other. Alternatively, they may be spaced apart from each other via a spacer made of a material such as resin. Furthermore, the movable magnet may be constructed using a combination of a spacer made of a magnetic material and a spacer made of a nonmagnetic material.

In the above-described embodiment, the movable magnet is formed in a cylindrical shape. Alternatively, the cross-sectional shape of the movable magnet may be a polygonal, elliptic shape, or a shape represented by a combination of a curved line and a straight line. In this case, the cross-sectional shape of each of the solenoid coil and the spacer for magnet may be made to match the cross-sectional shape of the movable magnet.

In addition, a guide rail may be provided to the inner diameter of the solenoid coil, and a roller may be attached to the side of the movable magnet. By contraries, a roller may be attached to the inner diameter of the solenoid coil, and a guide rail may be attached to the side of the movable magnet. By constructing the oscillation type electromagnetic power generator as described above, it exerts an advantageous effect of smoothly moving the movable magnet and thereby obtaining power-generation capacity even if only slight force is applied.

EXPLANATION OF REFERENCE SIGNS

1. Solenoid coil
2. Cylindrical magnet
3. Output voltage waveform
10. Oscillation type electromagnetic power generator
20. Oscillation type electromagnetic power generator
21. First solenoid coil
22. Second solenoid coil
23. Third solenoid coil
24. Coil gap
25. Movable magnet
40. Oscillation type electromagnetic power generator
41. First solenoid coil
42. Second solenoid coil
43. Third solenoid coil
44. Coil gap
45. First magnet
46. Second magnet
47. Spacer
48. Movable magnet
61. Cylindrical magnet
70. Movable magnet
71. Spacer (nonmagnetic material)
80. Movable magnet
81. Spacer (magnetic material)

The invention claimed is:

1. A method for manufacturing an oscillation type electromagnetic power generator including a power generation coil in which two or more solenoid coils are connected in series, and a movable magnet including a plurality of magnets that are arranged such that magnetic poles of magnets facing each other have the same polarity, the movable magnet being located inside of the power generation coil and movable in a direction along a winding axis of the power generation coil, wherein the two or more solenoid coils of the power generation coil are spaced apart with a predetermined coil gap and wound in directions reverse to each other for each adjacent coil, and adjacent magnets of the movable magnet being connected to each other via a spacer having a predetermined thickness in such a manner that the poles with the same polarity are opposed to each other, the method comprising steps of:
    making a solenoid coil having a predetermined coil diameter, a predetermined number of turns per unit length, and a coil length which is at least three times longer than the coil diameter;
    measuring rise characteristics of an output voltage when allowing a magnet having a predetermined magnet diameter and a length that is substantially the same as the coil length to pass through the solenoid coil at a predetermined passage speed;
    obtaining from the measured rise characteristics a rise time elapsing from when the output voltage reaches 10% of a peak amplitude to when the output voltage reaches 90% of the peak amplitude; and
    determining a length which is substantially two times as long as a length obtained from the rise time and the passage speed as a length of a magnet pitch which is a total dimension of a magnet length of one magnet of the movable magnet and the thickness of the spacer.

2. The method according to claim 1, wherein a coil pitch which is a total dimension of a coil length of one solenoid coil of the two or more solenoid coils and the coil gap is substantially equal to the magnet pitch, and the coil length is shorter than the magnet length.

3. The method according to claim 1 or 2, wherein a roller is provided to a side surface of the movable magnet, and guide rails corresponding to the roller are provided to inner wall surfaces of the two or more solenoid coils respectively.

4. The method according to claim 1 or 2, wherein inner diameters of the two or more solenoid coil are each larger than a diameter of the magnet.

5. The method according to claim 1 or 2, wherein the spacer is made of a magnetic material.

6. An oscillation type electromagnetic power generator manufactured by the method described in claim 1.

* * * * *